(12) United States Patent
Kobylevsky et al.

(10) Patent No.: US 8,738,393 B2
(45) Date of Patent: May 27, 2014

(54) SYSTEM AND METHOD FOR TARGETED HEALTHCARE MESSAGING

(75) Inventors: Paul Kobylevsky, Flushing, NY (US); Valery Gurovich, Ramsey, NJ (US)

(73) Assignee: Telemanager Technologies, Inc., Newark, NJ (US)

( * ) Notice: Subject to any disclaimer, the term of this patent is extended or adjusted under 35 U.S.C. 154(b) by 765 days.

(21) Appl. No.: 11/711,496

(22) Filed: Feb. 27, 2007

(65) Prior Publication Data

US 2008/0208986 A1    Aug. 28, 2008

(51) Int. Cl.
*G06Q 50/00* (2012.01)
*G06Q 10/00* (2012.01)

(52) U.S. Cl.
USPC .................................................. 705/2; 705/3

(58) Field of Classification Search
USPC ............................................................. 705/2
See application file for complete search history.

(56) References Cited

U.S. PATENT DOCUMENTS

| | | |
|---|---|---|
| 4,436,962 A | 3/1984 | Davis et al. |
| 4,766,542 A | 8/1988 | Pilarczyk |
| 4,958,280 A | 9/1990 | Pauly et al. |
| 4,975,841 A | 12/1990 | Kehnemuyi et al. |
| 5,208,762 A | 5/1993 | Charhut et al. |
| 5,249,221 A | 9/1993 | Ketring |
| 5,327,341 A | 7/1994 | Whalen et al. |
| 5,345,501 A | 9/1994 | Shelton |
| 5,428,670 A | 6/1995 | Gregorek et al. |
| 5,444,767 A | 8/1995 | Goetcheus et al. |
| 5,450,488 A | 9/1995 | Pugaczewski et al. |
| 5,475,742 A | 12/1995 | Gilbert |
| 5,509,064 A | 4/1996 | Welner et al. |
| 5,511,594 A | 4/1996 | Brennan et al. |
| 5,546,452 A | 8/1996 | Andrews et al. |
| 5,597,995 A | 1/1997 | Williams et al. |
| 5,612,869 A | 3/1997 | Letzt et al. |

(Continued)

FOREIGN PATENT DOCUMENTS

| | | |
|---|---|---|
| WO | WO 01/91105 A2 | 11/2001 |
| WO | WO 03/069597 A1 | 8/2003 |
| WO | WO 2006/031983 A2 | 3/2006 |

OTHER PUBLICATIONS

Cain, Health e-People: The Online Consumer Experience, Aug. 2000, Institute for the Future.*

(Continued)

*Primary Examiner* — Tran Nguyen
(74) *Attorney, Agent, or Firm* — McCarter & English, LLP

(57) ABSTRACT

A system and method for targeted pharmaceutical messaging is provided. The system includes a central targeted messaging server for receiving targeted advertisements or messages from a plurality of data sources, a notification database for storing the targeted messages and associated, pre-defined criteria, and a web server which can communicate with a plurality of message requesters to receive requests for targeted messages and to convey same to the plurality of message requesters. A customized web site could be provided for allowing vendors (e.g., pharmaceutical companies, etc.) to upload targeted message text files and/or voice files to the system of the present invention. In response to prescription-related activity, requests for targeted messages are transmitted by the plurality of message requesters to the system of the present invention. The targeted messaging server queries the notification database to identify a matching targeted message, and responds with the location of a matching targeted message text and/or voice file. The matching targeted message can then be transmitted and conveyed to the recipient.

16 Claims, 10 Drawing Sheets

(56) References Cited

U.S. PATENT DOCUMENTS

| | | | |
|---|---|---|---|
| 5,636,209 A | 6/1997 | Perlman | |
| 5,646,912 A | 7/1997 | Cousin | |
| 5,666,492 A | 9/1997 | Rhodes et al. | |
| 5,737,396 A | 4/1998 | Garcia | |
| 5,737,539 A * | 4/1998 | Edelson et al. | 705/3 |
| 5,772,585 A | 6/1998 | Lavin et al. | |
| 5,825,856 A | 10/1998 | Porter et al. | |
| 5,845,255 A | 12/1998 | Mayaud | |
| 5,884,262 A | 3/1999 | Wise et al. | |
| 5,907,493 A | 5/1999 | Boyer et al. | |
| 5,909,670 A | 6/1999 | Trader et al. | |
| 5,915,001 A | 6/1999 | Uppaluru | |
| 5,926,526 A | 7/1999 | Rapaport et al. | |
| 5,950,630 A | 9/1999 | Portwood et al. | |
| 5,950,632 A | 9/1999 | Reber et al. | |
| 5,970,124 A | 10/1999 | Csaszar et al. | |
| 5,970,462 A | 10/1999 | Reichert | |
| 5,971,594 A | 10/1999 | Sahai et al. | |
| 5,982,863 A | 11/1999 | Smiley et al. | |
| 5,996,006 A | 11/1999 | Speicher | |
| 6,014,631 A | 1/2000 | Teagarden et al. | |
| 6,018,713 A * | 1/2000 | Coli et al. | 705/2 |
| 6,055,513 A | 4/2000 | Katz et al. | |
| 6,061,347 A | 5/2000 | Hollatz et al. | |
| 6,088,429 A | 7/2000 | Garcia | |
| 6,108,634 A | 8/2000 | Podnar et al. | |
| 6,112,182 A | 8/2000 | Akers et al. | |
| 6,161,095 A | 12/2000 | Brown | |
| 6,192,112 B1 | 2/2001 | Rapaport et al. | |
| 6,202,923 B1 | 3/2001 | Boyer et al. | |
| 6,240,394 B1 | 5/2001 | Uecker et al. | |
| 6,269,336 B1 | 7/2001 | Ladd et al. | |
| 6,298,330 B1 | 10/2001 | Gardenswartz et al. | |
| 6,314,402 B1 | 11/2001 | Monaco et al. | |
| 6,421,427 B1 | 7/2002 | Hill et al. | |
| 6,456,699 B1 | 9/2002 | Burg et al. | |
| 6,493,427 B1 | 12/2002 | Kobylevsky et al. | |
| 6,578,003 B1 | 6/2003 | Camarda et al. | |
| 6,680,999 B1 | 1/2004 | Garcia | |
| 6,687,676 B1 | 2/2004 | Denny | |
| 6,718,017 B1 | 4/2004 | Price et al. | |
| 6,744,862 B2 | 6/2004 | Kobylevsky et al. | |
| 6,754,636 B1 | 6/2004 | Walker et al. | |
| 6,768,788 B1 | 7/2004 | Langseth et al. | |
| 6,778,647 B1 | 8/2004 | Dumas | |
| 6,804,333 B1 | 10/2004 | Liu et al. | |
| 6,804,654 B2 | 10/2004 | Kobylevsky et al. | |
| 6,850,603 B1 | 2/2005 | Eberle et al. | |
| 6,973,435 B1 | 12/2005 | Sioufi et al. | |
| 6,999,930 B1 | 2/2006 | Roberts et al. | |
| 7,058,584 B2 | 6/2006 | Kosinski et al. | |
| 7,149,287 B1 | 12/2006 | Burger et al. | |
| 7,174,006 B2 | 2/2007 | Guedalia et al. | |
| 7,267,278 B2 | 9/2007 | Lammle | |
| 7,349,947 B1 | 3/2008 | Slage et al. | |
| 7,469,213 B1 | 12/2008 | Rao | |
| 7,558,380 B2 | 7/2009 | DiVenuta et al. | |
| 7,620,161 B2 | 11/2009 | Liu et al. | |
| 7,769,601 B1 | 8/2010 | Bleser et al. | |
| 7,848,934 B2 | 12/2010 | Kobylevsky et al. | |
| 8,150,706 B2 | 4/2012 | Kobylevsky et al. | |
| 2001/0012335 A1 | 8/2001 | Kaufman et al. | |
| 2002/0007285 A1 | 1/2002 | Rappaport | |
| 2002/0010584 A1 | 1/2002 | Schultz et al. | |
| 2002/0023230 A1 | 2/2002 | Bolnick et al. | |
| 2002/0048349 A1 | 4/2002 | Bixler et al. | |
| 2002/0052760 A1 | 5/2002 | Munoz et al. | |
| 2002/0052762 A1 | 5/2002 | Kobylevsky et al. | |
| 2002/0091566 A1 | 7/2002 | Siegel | |
| 2002/0095261 A1 * | 7/2002 | Gut et al. | 702/19 |
| 2002/0143579 A1 | 10/2002 | Docherty et al. | |
| 2002/0164004 A1 | 11/2002 | Tamura et al. | |
| 2003/0018495 A1 | 1/2003 | Sussman | |
| 2003/0050799 A1 | 3/2003 | Jay et al. | |
| 2003/0093295 A1 | 5/2003 | Lilly et al. | |
| 2003/0120513 A1 | 6/2003 | Samaquial | |
| 2003/0154106 A1 | 8/2003 | Marks | |
| 2003/0212558 A1 | 11/2003 | Matula | |
| 2003/0216831 A1 | 11/2003 | Hart et al. | |
| 2003/0225595 A1 | 12/2003 | Helmus et al. | |
| 2003/0236729 A1 | 12/2003 | Epstein et al. | |
| 2004/0019502 A1 | 1/2004 | Leaman et al. | |
| 2004/0019567 A1 | 1/2004 | Herceg et al. | |
| 2004/0037401 A1 | 2/2004 | Dow et al. | |
| 2004/0071275 A1 | 4/2004 | Bowater et al. | |
| 2004/0107117 A1 | 6/2004 | Denny | |
| 2004/0122712 A1 | 6/2004 | Hill, Sr. et al. | |
| 2004/0172295 A1 | 9/2004 | Dahlin et al. | |
| 2004/0228457 A1 | 11/2004 | Espejo et al. | |
| 2005/0060200 A1 | 3/2005 | Kobylevsky et al. | |
| 2005/0069103 A1 | 3/2005 | DiVenuta et al. | |
| 2005/0080651 A1 | 4/2005 | Morrison et al. | |
| 2005/0209879 A1 | 9/2005 | Chalmers | |
| 2006/0149587 A1 | 7/2006 | Hill, Sr. et al. | |
| 2006/0247968 A1 | 11/2006 | Kadry | |
| 2006/0271398 A1 | 11/2006 | Belcastro | |
| 2007/0119930 A1 | 5/2007 | Jordan et al. | |
| 2007/0214009 A1 | 9/2007 | Epstein et al. | |
| 2007/0219822 A1 | 9/2007 | Godwin et al. | |
| 2007/0250341 A1 | 10/2007 | Howe et al. | |
| 2008/0208628 A1 | 8/2008 | Kobylevsky et al. | |
| 2008/0228519 A1 | 9/2008 | Leon | |
| 2009/0006141 A1 | 1/2009 | Karr | |
| 2010/0215155 A1 | 8/2010 | OHanlon | |
| 2010/0239075 A1 | 9/2010 | Kobylevsky et al. | |
| 2011/0082705 A1 | 4/2011 | Kobylevsky et al. | |
| 2012/0330678 A1 | 12/2012 | Kobylevsky et al. | |

OTHER PUBLICATIONS

Cain (Health e-People: The Online Consumer Experience).*
Wilkes, Direct-to-consumer prescription drug advertising: trends, impact, and implications, 2000, Health Affairs, 19, No. 2 (2000):110-128.*
Office Action dated Sep. 29, 2009, from pending U.S. Appl. No. 10/641,307 (10 pages).
Office Action dated Dec. 8, 2009, from pending U.S. Appl. No. 09/858,877 (14 pages).
Office Action dated Jan. 14, 2010, received from the Canadian Patent Office, in connection with pending Canadian Application No. 2,475,959 (4 pages).
International Search Report of the International Searching Authority mailed May 5, 2009, issued in connection with International Patent Appln. No. PCT/US09/37948 (3 pages).
Written Opinion of the International Searching Authority mailed May 5, 2009, issued in connection with International Patent Appln. No. PCT/US09/37948 (5 pages).
Office Action dated Apr. 15, 2009, from pending U.S. Appl. No. 09/858,877 (10 pages).
Office Action dated Nov. 5, 2008, from issued U.S. Patent No. 7,558,380 (12 pages).
Notice of Allowance dated Mar. 6, 2009, from issued U.S. Patent No. 7,558,380 (9 pages).
Press release dated 1999 and entitled "Hannaford Bros. Installs Refill Telemanger IVR System," (1 page).
Printout dated Oct. 31, 2001, entitled: "Refill Telemanager—The Affordable Automation Tool for Prescription Refills," (http://www.telemanager.com/RTInfo/RTInfo.html) (3 pages).
"2008 Buyers Guide Quick Reference Table," ComputerTalk Magazine, Mar./Apr. 2008, p. 85 (1 page).
"TeleManager Technologies, Inc.—The New Prescription for All Your Telecommunication Needs," ComputerTalk, (2008) p. 42 (1 page).
Brochure, "Refill Telemanager In-Store IVR System," (2007) (1 page).
Brochure, "Telemanager On-Demand IVR System," (2007) (1 page).
Brochure, "New Community Pharmacy Automated Refill Telephone System," (1992) (2 pages).
"Quick Reference Guide," (1992) (1 page).
Brochure, "Refill Telemanager—The Affordable Automation Tool for Prescription Refills," (1990) (2 pages).

(56) References Cited

OTHER PUBLICATIONS

"Refill Telemanager User's Guide," (2009) (58 pages).
"Refill Telemanager User's Guide," (1997) (37 pages).
Brochure, "Refill Telemanager Service," (1998) (2 pages).
Brochure, "Refill Telemanager Service—Frequently Asked Questions," (1998) (1 page).
Brochure, "Finally! Unique, New Technology Designed to Increase Your Sales, Customer Service, and Employee Productivity at a Price Every Store Can Afford!," (1998) (1 page).
Brochure, "Refill Telemanager Service—Information Retrieval Guide" (1998) (2 pages).
Brochure, "Refill Telemanager Service" (1998) (2 pages).
"Microlog Expands Services for the Retail Pharmacy Market," PR Newswire, Aug. 22, 1997 (1 page).
"Dial-a-Script Saves Bi-Mart Money and Time," Drug Store News, vol. 22, Issue 12, Aug. 28, 2000 (1 page).
Popolillo, "Shopko, ateb Team Up for Pharmacy Convenience," Drug Store News, vol. 21, Issue 4, Mar. 1, 1999 (2 pages).
Frederick, "Wal-Mart's New Combo Format Drawing Pharmacy, Food Customers," Drug Store News, Nov. 23, 1998 (3 pages).
Frederick, "American Drug Stores," Drug Store News, vol. 18, Issue 7, Apr. 29, 1996 (3 pages).
"Shopko Sees Health Cam as Core Part of Operation," Chain Drug Review, No. 14, vol. 21, Aug. 30, 1999 (2 pages).
"CVS Uses Technology to Change the Face of its Pharmacy Business; RX: Marketplace," Chain Drug Review, No. 21, vol. 19, Dec. 15, 1997 (2 pages).
"Longs Drugs Rolling Out Novadigm to 380+ Remote Stores to Deploy and Manage Its Core Business Applications," PR Newswire, Aug. 23, 1999 (2 pages).
"Microlog Completes Systems Integration Work for Eckerd Pharmacy Chain Equities," PR Newswire, Jul. 21, 1999 (2 pages).
"Getting the Message; How Protodigm and Pharmacia & Upjohn Use Communications Systems," Pharmaceutical Times, Jul. 31, 1998 (1 page).
"Synectics Inks IRV Pact With Wal-Martannotated Title-Wal-Mart Pharmacies Will Use an Interactive Voice Response System Developed by Synectics, Inc. (Raleigh, NC) to Give Customers and Doctors 24-Hour Access to the Pharamacy," Drug Store News, vol. 19, Issue 17, Oct. 20, 1997 (3 pages).
"Touch Tone Prescriptions: Telephony and Beyond," Pharmacy Times, vol. 63, 1997 (2 pages).
Thompson, "Expanding Role of Certified Pharmacy Technicians in Outpatient Pharmacy Automation Management," ASHP Midyear Clinical Meeting, vol. 32, Dec. 1997 (1 page).
"ATEB Installs Pharmacy Line Voice Response System at ShopKo Stores," Drug Store News, vol. 20, Issue 13, Aug. 24, 1998 (1 page).
Pastore, "Voice System Reins in Agency's Costs," Computerworld, Sep. 17, 1990 (2 pages).
SOAP Version 1.2 Part 1: Messaging Framework (Second Edition), http://www.w3.org/TR/soap12-part1/, Apr. 27, 2007 (47 pages).
Chopra, et al., "Voice-Activated Networked Workstation for a Physically Disabled Physician," Proceedings of the 16th Annual Int'l Conf. of the IEEE, Nov. 3-6, 1994.
Refill Telemanger, Logicom, 1996.
PCT International Search Report mailed Feb. 23, 2007, in connection with International Publication No. WO 2006/031983 A2 (3 pages).
PCT Written Opinion mailed Feb. 23, 2007, in connection with International Publication No. WO 2006/031983 A2 (3 pages).
PCT International Preliminary Examination Report mailed Mar. 20, 2007, in connection with International Publication No. WO 2006/031983 A2 (4 pages).
PCT International Search Report mailed Jul. 11, 2003, in connection with International Publication No. WO 03/069597 A1 (4 pages).
Press Release entitled "Harland Financial Solutions and Maxxar Corporation Establish Alliance to Bring One-to-One Marketing to Telephone Banking," dated Jan. 9, 2001 by Harland Financial Solutions (2 pages).
Brochure entitled "Customer Capture—CTG Implements a Customer-Specific Marketing Program for a Major Retailer," dated Sep. 2003 by CTG (2 pages).
Brochure entitled "TeleVoice—The Next Generation of Voice Response for Mortgage Servicing Call Centers," dated Mar. 2006 by Fidelity National Information Services (6 pages).
"Case Studies—Client: State of Michigan Office of Retirement Services," website printout from http:/www.covansys.com/clients/case_michigan.htm, dated Apr. 13, 2006 (4 pages).
Notice of Allowance dated Aug. 16, 2002, from U.S. Patent No. 6,493,427 (5 pages.
Interview Summary dated May 31, 2002, from U.S. Patent No. 6,493,427 (3 pages).
Office Action dated Apr. 12, 2002, from U.S. Patent No. 6,493,427 (9 pages).
Office Action dated Oct. 22, 2001, from U.S. Patent No. 6,493,427 (27 pages).
Advisory Action dated May 23, 2001, from U.S. Patent No. 6,493,427 (4 pages).
Office Action dated Jan. 31, 2001, from U.S. Patent No. 6,493,427 (15 pages).
Office Action dated May 22, 2000, from U.S. Patent No. 6,493,427 (19 pages).
Supplemental Notice of Allowability dated May 4, 2004, from U.S. Patent No. 6,744,862 (5 pages).
Notice of Allowance dated Jan. 13, 2004, from U.S. Patent No. 6,744,862 (6 pages).
Office Action dated Oct. 3, 2003, from U.S. Patent No. 6,744,862 (10 pages).
Response to Rule 312 Communication dated Aug. 25, 2004, from U.S. Patent No. 6,804,654 (3 pages).
Notice of Allowance dated Jun. 28, 2004, from U.S. Patent No. 6,804,654 (4 pages).
Inteview Summary dated Mar. 10, 2004, from U.S. Patent No. 6,804,654 (4 pages).
Office Action dated Dec. 18, 2003, from U.S. Patent No. 6,804,654 (11 pages).
Office Action dated Jun. 16, 2003, from U.S. Patent No. 6,804,654 (10 pages).
Office Action dated Oct. 14, 2008, from pending U.S. Appl. No. 09/858,877 (6 pages).
Office Action dated Jan. 15, 2008, from pending U.S. Appl. No. 09/858,877 (22 pages).
Office Action dated Jul. 19, 2007, from pending U.S. Appl. No. 09/858,877 (23 pages).
Office Action dated Dec. 12, 2006, from pending U.S. Appl. No. 09/858,877 (21 pages).
Advisory Action dated Oct. 10, 2006, from pending U.S. Appl. No. 09/858,877 (4 pages).
Office Action dated May 31, 2006, from pending U.S. Appl. No. 09/858,877 (23 pages).
Office Action dated Aug. 11, 2005, from pending U.S. Appl. No. 09/858,877 (22 pages).
Office Action dated Jun. 11, 2008, from pending U.S. Appl. No. 10/672,556 (13 pages).
Office Action dated Feb. 5, 2008, from pending U.S. Appl. No. 10/672,556 (13 pages).
Notice of Allowance dated Aug. 23, 2010, from pending U.S. Appl. No. 09/858,877 (7 pages).
Interview Summary dated Sep. 13, 2010, from pending U.S. Appl. No. 10/941,307 (6 pages).
Office Action dated Oct. 1, 2010, from pending U.S. Appl. No. 12/058,931 (13 pages).
Office Action dated Mar. 20, 2012, from pending U.S. Appl. No. 12/409,173 (11 pages).
Office Action dated Oct. 3, 2011, from pending U.S. Appl. No. 12/947,355 (10 pages).
Office Action dated Oct. 10, 2012, from pending U.S. Appl. No. 12/409,173 (10 pages).
Office Action dated Jul. 24, 2012, from pending U.S. Appl. No. 12/947,355 (12 pages).
Office Action dated Apr. 5, 2011, from pending U.S. Appl. No. 10/941,307 (14 pages).

(56) References Cited

OTHER PUBLICATIONS

Office Action dated Feb. 18, 2011, received from the Canadian Patent Office in connection with Canadian Patent Application No. 2,475,959 (4 pages).

Office Action dated Feb. 13, 2013, from pending U.S. Appl. No. 13/540,780 (14 pages).

Office Action dated Sep. 6, 2011, from pending U.S. Appl. No. 12/409,173 (10 pages).

Office Action dated Jun. 27, 2011, from pending U.S. Appl. No. 12/058,931 (13 pages).

Interview Summary dated Aug. 22, 2011, from pending U.S. Appl. No. 12/058,931 (4 pages).

Office Action dated Apr. 18, 2013, from pending U.S. Appl. No. 12/409,173 (12 pages).

Office Action dated May 17, 2013, issued in connection with Canadian Patent Application No. 2,580,258 (2 pages).

Notice of Allowance dated Dec. 19, 2011, from pending U.S. Appl. No. 10/941,307(12 pages).

Dialog OuickSearch, http://dialogquicksearch.dialog.com/USPTO/search/doSearch.action, provided by USPTO with Notice of Allowance from pending U.S. Appl. No. 10/941,307 mailed on Dec. 19, 2011 (5 pages).

Office Action dated Mar. 18, 2014, from pending U.S. Appl. No. 12/058,931.

Office Action dated Oct. 25, 2013, from pending U.S. Appl. No. 12/409,173 (12 pages).

Office Action dated Dec. 3, 2013, from pending U.S. Appl. No. 13/540,780 (10 pages).

Office Action dated May 25, 2010, from pending U.S. Appl. No. 10/941,307 (12 pages).

Interview Summary dated May 25, 2010, from pending U.S. Appl. No. 09/858,877 (3 pages).

\* cited by examiner

SYSTEM AND METHOD FOR TARGETED HEALTHCARE MESSAGING

BACKGROUND OF THE INVENTION

1. Field of the Invention

The present invention relates to computer systems for automatically delivering targeted messages to recipients. More specifically, the present invention relates to a system and method for automatically delivering targeted pharmaceutical messages to recipients such as patients, prescribers, pharmacy staff, and other individuals involved in the selection and use of pharmaceuticals and other health care products.

2. Related Art

Electronic advertising systems are well-known in the art. Such systems allow targeted advertisements and messages to be sent to specific recipients, so as to maximize the likelihood that the recipient will purchase advertised goods or services, participate in a requested activity, or provide requested information. Such systems may be operated in connection with interactive voice response (IVR) systems, wherein a targeted advertisement or message is played to a caller. Other systems are operated in connection with Internet web pages, wherein user statistics are tracked by web sites, targeted advertisements or messages are generated based upon the statistics, and the targeted advertisements or messages are transmitted to the user's web browser for display to the user. Still further, various types of targeted electronic mail (e-mail) advertisement systems are known in the art.

It is also known in the art to provide targeted messages to a caller of an IVR-based prescription system. In such systems, a caller dials a telephone number and is provided with information about a particular type of prescription, or other information relating to pharmaceuticals. Additionally, educational information can be provided to the caller.

A particular drawback with existing targeted messaging systems is that they do not provide a central (or universal) system wherein targeted advertisements and messages generated by a plurality of data sources, such as a plurality of pharmaceutical companies, can be centrally gathered and incoming requests for targeted messages can be processed over the Internet. Additionally, such systems do not allow targeted messages to be sent to a plurality of recipients so that targeted messages can be conveyed to recipients in multiple formats, such as by physical mailing, in IVR telephone calls, by electronically transmitting targeted messages to one or more pharmacy computer systems for use thereby, by printing advertisements at pharmacy points-of-sale, in web-based prescription refill applications, in electronic prescription and/or transcription sessions, and by facsimile. As such, the reach of existing systems to a multitude of recipients, each using various communications formats, is limited.

Accordingly, what would be desirable, but has not yet been provided, is a system and method for targeted pharmaceutical messaging which addresses the foregoing limitations of existing messaging systems.

SUMMARY OF THE INVENTION

The present invention relates to a system and method for targeted pharmaceutical messaging. The system includes a central targeted messaging server for receiving targeted advertisements or messages from a plurality of data sources, such as a plurality of pharmaceutical companies, and assigning one or more pre-defined criteria to each message; a notification database for storing the targeted messages and the pre-defined criteria; and a web server which can communicate with a plurality of message requesters to receive requests for targeted messages and to convey same to the plurality of message requesters. A "self-service" web application could be provided by the system, wherein a vendor (e.g., a pharmaceutical company, etc.) can upload a customized targeted message file and/or an associated voice file to the system using a conventional web browser. The notification database is populated by the uploaded targeted message files and/or voice files, and pre-defined criteria are associated with the uploaded targeted message file and/or voice files and stored in the notification database.

In response to a prescription-related activity (such as a patient requesting a prescription refill (in person or electronically), a doctor prescribing a drug (electronically or otherwise), a pharmacist refilling a prescription, authorization of a prescription refill by a doctor, or other prescription-related activity), a request for a targeted message is generated and transmitted to the system of the present invention. Incoming requests may be received by the system of the present invention as hypertext transfer protocol (HTTP), extensible markup language (XML), and/or simple object access protocol (SOAP) requests for targeted messages. The requests contain one or more pre-defined criteria such as patient age, patient gender, National Drug Council (NDC) drug code, original fill date for a prescription, number of refills remaining, quantity remaining, days of supply on last refill, and other information. The targeted messaging server queries the notification database using the pre-defined criteria to identify a matching targeted message. The matching targeted message is then transmitted to the recipient in a suitable format, such as in a text file and/or a voice file, and conveyed to the recipient. The recipient can transmit a message delivery receipt to the targeted messaging server and the targeted messaging server can reply with a delivery confirmation response, so as to confirm receipt of the targeted message to the recipient. The system of the present invention allows targeted messages to be electronically transmitted to recipients in multiple formats, such as by physical mail, electronic mail, audibly in an IVR prescription refill telephone call, printed at a point of sale, audibly in an electronic prescription or transcription session, or by facsimile, etc.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for targeted pharmaceutical messaging which includes a central targeted messaging server for receiving targeted advertisements or messages from a plurality of data sources, a notification database for storing the targeted messages and associated, pre-defined criteria, and a web server which can communicate with a plurality of message requesters to receive requests for targeted messages and to convey same to the plurality of message requesters. A customized web site could be provided for allowing vendors (e.g., pharmaceutical companies, etc.) to upload targeted message text files and/or voice files to the system of the present invention. In response to prescription-related activity, requests for targeted messages are transmitted by the plurality of message requesters to the system of the present invention. Incoming requests are received by the system of the present invention and contain one or more pre-defined criteria. The targeted messaging server queries the targeted message database using the pre-defined criteria to identify a matching targeted message. The matching targeted message is then transmitted to the recipient in a suitable format, such as in a text file and/or a voice file, and conveyed to the recipient.

Figure 1:
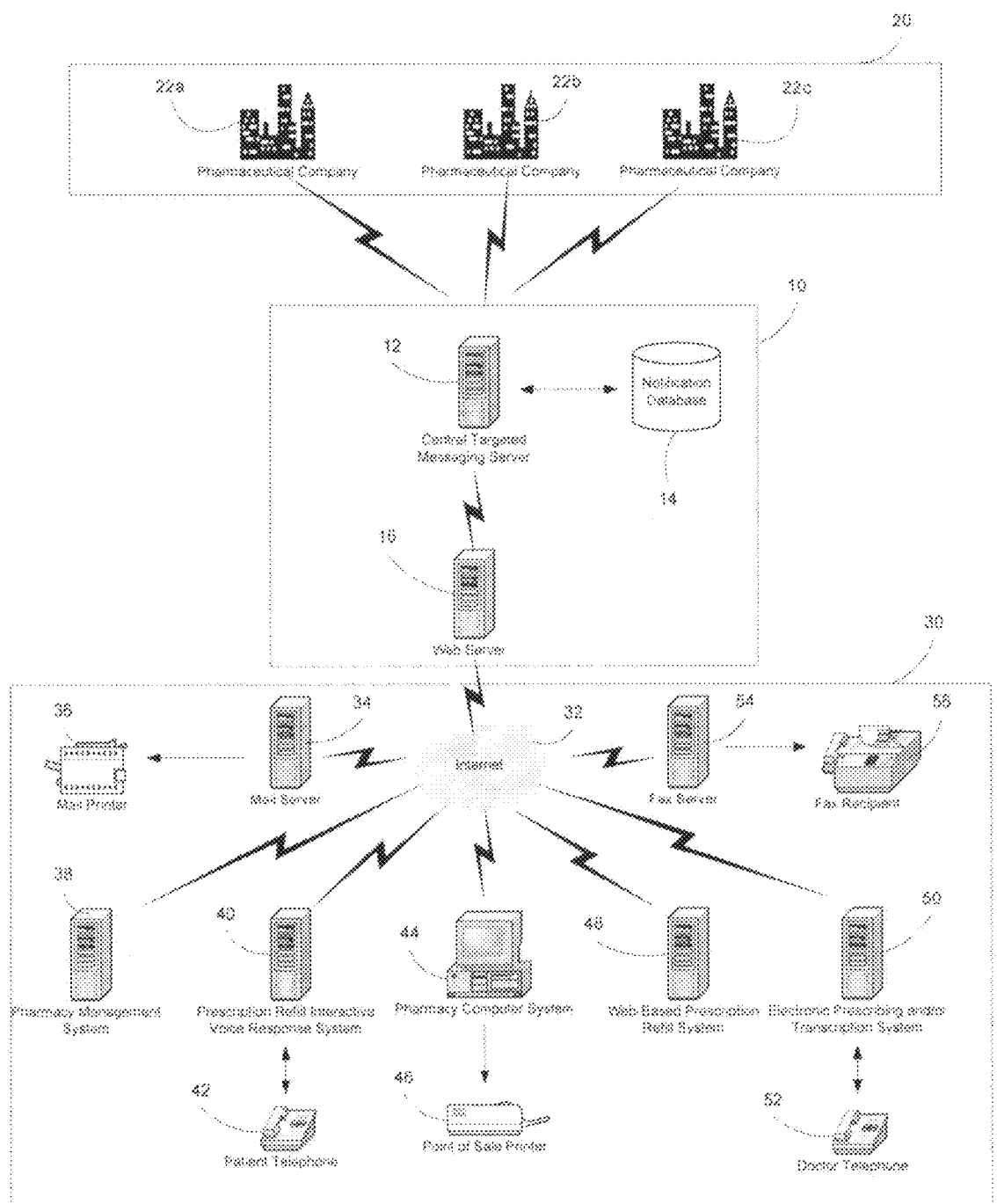
FIG. 1 is a block diagram showing the targeted pharmaceutical messaging system of the present invention.

FIG. 1 is a block diagram showing the targeted pharmaceutical messaging system (hereinafter, "TPMS" or "notification web service") of the present invention, indicated generally at 10. The TPMS 10 includes a central targeted messaging server 12, a notification database 14, and a web server 16. The central targeted messaging server 12 communicates with a plurality of data sources 20, such as pharmaceutical companies 22a-22c, to obtain targeted messages relating to pharmaceutical products. Such messages could be electronically transmitted between the data sources 20 and the central targeted messaging server 12 (e.g., over the Internet or through a private network connection, such as a wide-area network (WAN) connection, as e-mails, electronic data interchange (EDI) messages, extensible markup language (XML) messages, file transfer protocol (FTP) file transfers, etc., or any other suitable electronic communications format). Other forms of communication between the data sources 20 and the TPMS 10 are possible, such as by physical mailing or facsimile transmission of targeted messages by the data sources 20 to the TPMS 10. In such circumstances, the messages would be converted by the TPMS 10 into electronic format for storage therein. Importantly, the TPMS 10 can be configured to receive targeted pharmaceutical messages. A customized, "self-service" web site could be provided by the TPMS 10, wherein one or more of the data sources 20 can upload targeted message text and/or voice files to the TMPS 10. Such a web site could be accessed by the data sources 20 using conventional web browsers. User accounts could be provided, such that each data source 20 could selectively log onto the TPMS 10 to modify existing messages, delete messages, upload new messages, and change parameters associated with each message.

The central targeted messaging server 12 stores targeted pharmaceutical messages in the notification database 14. Each message is assigned a pre-defined criteria by the central targeted messaging server 12, or by the data sources 20, so that appropriate messages can be retrieved from the notification database 14 in response to a request for a targeted message. Each targeted message and its associated pre-defined criteria are stored in the notification database 14.

The web server 16 of the TPMS 10 of the present invention can communicate with a plurality of message requesters 30 to receive requests for targeted pharmaceutical messages, transmit such requests to the messaging server 12, receive appropriate targeted messages from the messaging server 12, and transmit the targeted pharmaceutical messages to the plurality of message requesters 30. Communication between the web server 16 and the message requesters 30 is preferably by way of the Internet 32, using standard TCP/IP communications protocols such as hypertext transfer protocol (HTTP), secure HTTP (HTTPS), file transfer protocol (FTP), and other suitable protocols such as electronic data interchange (EDI). It is conceivable that the TPMS 10 could also be configured to communicate with the message requesters 30 using other types of communications media, such as wireless communications (e.g., across one or more cellular telephone networks, pager networks, short messaging service (SMS) communications, etc.) or any other suitable types of wireless or wired communications media. The message requesters 30 generate requests for targeted messages whenever prescription-related activity occurs. Examples of such activities include, but are not limited to, a prescription refill request by a patient (electronically or otherwise), a doctor creating a new prescription, a doctor authorizing a prescription refill request, a pharmacist re-filling a prescription, and other prescription-related activities.

Importantly, the TPMS 10 can receive requests for targeted pharmaceutical messages, and can deliver such messages, in a variety of formats and across a wide variety of end-user platforms. For example, the plurality of messages requesters 30 could include, but is not limited to, a mail server 34 and an associated mail printer 36, a pharmacy management system 38, a prescription refill interactive voice response system 40 (which allows for telephone communication with a patient using the patient's telephone 42), a pharmacy computer system 44 and an associated printer 46, a web-based prescription refill system 48, an electronic prescribing and/or electronic transcription system 50 (which allows for telephone communication with a doctor using the doctor's telephone 52, or using a doctor's computer system connected to the system 50 via the Internet), or a facsimile (fax) server 54 for allowing faxes to be sent to a fax recipient 56.

Figure 2:
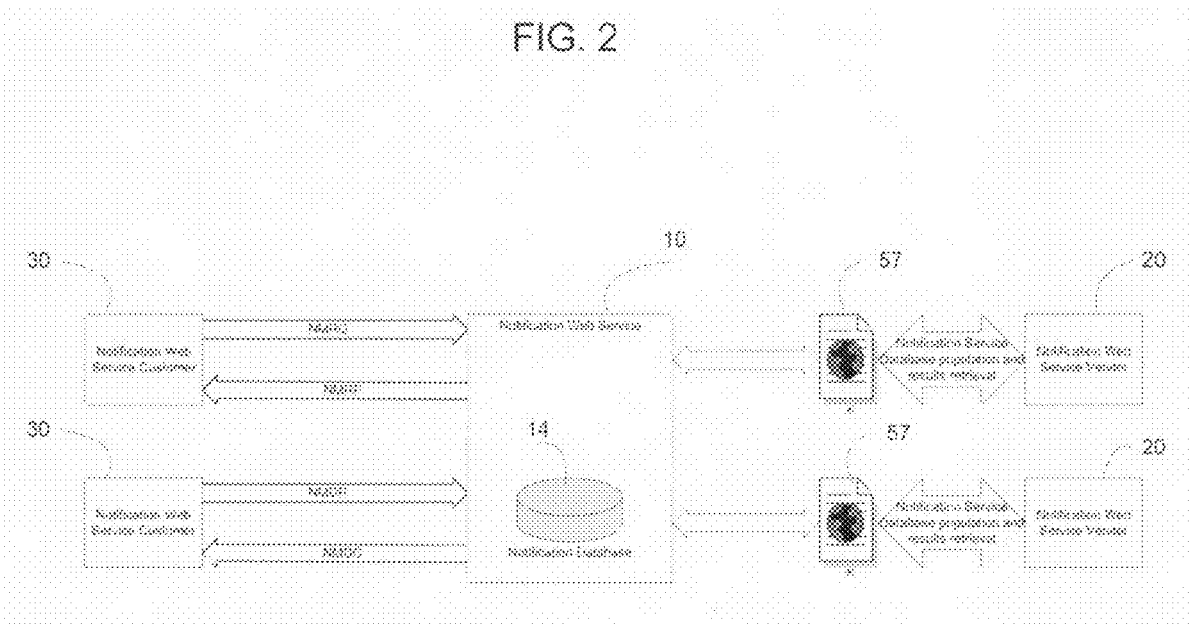
FIG. 2 is a block diagram showing transaction processing implemented by the targeted pharmaceutical messaging system of FIG. 1.

FIG. 2 is a block diagram showing transaction processing implemented by the TPMS 10 of the present invention. The TPMS 10 (also referred to in FIG. 2 as the notification web service) can provide a customized, "self-service" web site for allowing the data sources 20 (also referred to in FIG. 2 as notification web service vendors) to upload targeted message text and/or voice files to the TPMS 10. Such a web site could be presented to the data sources 20 using one or more secure web pages 57. Each data source 20 could be provided with a user account wherein targeted messages can be managed, edited, added, deleted, and attributes thereof modified as desired. One or more pre-defined criteria can be defined by the data sources 20, and associated with a particular targeted message.

The TPMS 10 populates the notification database 14 with the targeted message text and/or voice files, as well as the pre-defined criteria associated with each file. Examples of the pre-defined criteria could include, but are not limited to: message identifier; vendor identifier; drug item name; National Drug Council (NDC) identifier; therapeutic class; manufacturer; last fill dates (including minimum and/or maximum values); first fill dates (including minimum and/or maximum values); days of supply (including minimum and/or maximum values); original refill numbers (including minimum and/or maximum values); remaining refills (including minimum and/or maximum values); patient age (including minimum and/or maximum values); patient gender; patient diagnosis; patient disease state; text file identifier; voice file identifier; file location identifiers; update dates; and/or update identifiers. The locations of uploaded text and/or voice files can be stored as Uniform Resource Locator (URL) addresses, or in any other suitable format. It should also be noted that information relating to vendors (e.g., one or more of the data sources 20) and customers (e.g., one or more of the plurality of message requesters 30 of FIG. 1) could be associated with particular targeted messages and the notification database 14 populated with such information. Examples include, but are not limited to: vendor identifiers; vendor mailing address information; vendor phone information; vendor e-mails; vendor types; vendor account and password information; customer identifiers; customer mailing address information; customer phone information; customer e-mails; customer types; customer account and password information. Also, message logs could be created and stored in the notification database 14 to facilitate administration of transaction activities and user accounts.

In response to a prescription-related activity, one or more of the plurality of message requesters 30 (referred to in FIG. 2 as notification web service customers) generates a request for a targeted message in the form of a notification message request (NMRQ), and transmits the NMRQ to the TPMS 10. The NMRQ could be formatted and transmitted as a conventional Simple Object Access Protocol (SOAP) request (as defined in the SOAP 1.2 W3C specification, located on the Internet at http://www.w3.org/TR/soap/), or in any other suitable format. The NMRQ could include, but is not limited to, the following fields of information: customer identifier; NDC number; last fill date; first fill date; days of supply remaining in current prescription; number of original refills authorized; refills remaining; patient age; patient gender; patient diagnosis; and/or patient disease state.

Upon receipt of the NMRQ, the TPMS 10 utilizes one or more of the fields of the NMRQ to retrieve a matching targeted message from the notification database 14. When a matching targeted message record is found, a notification message response (NMRP) is created by the TPMS 10 and transmitted to the message requester 30 in the form of a SOAP response. It should be noted that any other suitable message format could be used. The NMRP includes, but is not limited to, the following fields of information: customer identifier; message identifier; message retrieval transaction identifier; message retrieval result; and message file location.

When the NMRP is received by the message requester 30, a notification message delivery receipt (NMDR) is sent by the message requester 30 to the TPMS 10. The NMDR could be a SOAP request (or other suitable format) which includes, but is not limited to, the following fields of information: customer identifier; message identifier; message retrieval transaction identifier; and message delivery result. In response to the NMDR, the TPMS 10 generates a notification message delivery confirmation (NMDC), which is sent to the message requester 30 as final confirmation of the transaction. The NMDC could be a SOAP reply (or other suitable format), which includes, but is not limited to, the following fields of information: message delivered indication; message delivery failure indication; or message delivery declined indication.

Figure 3:
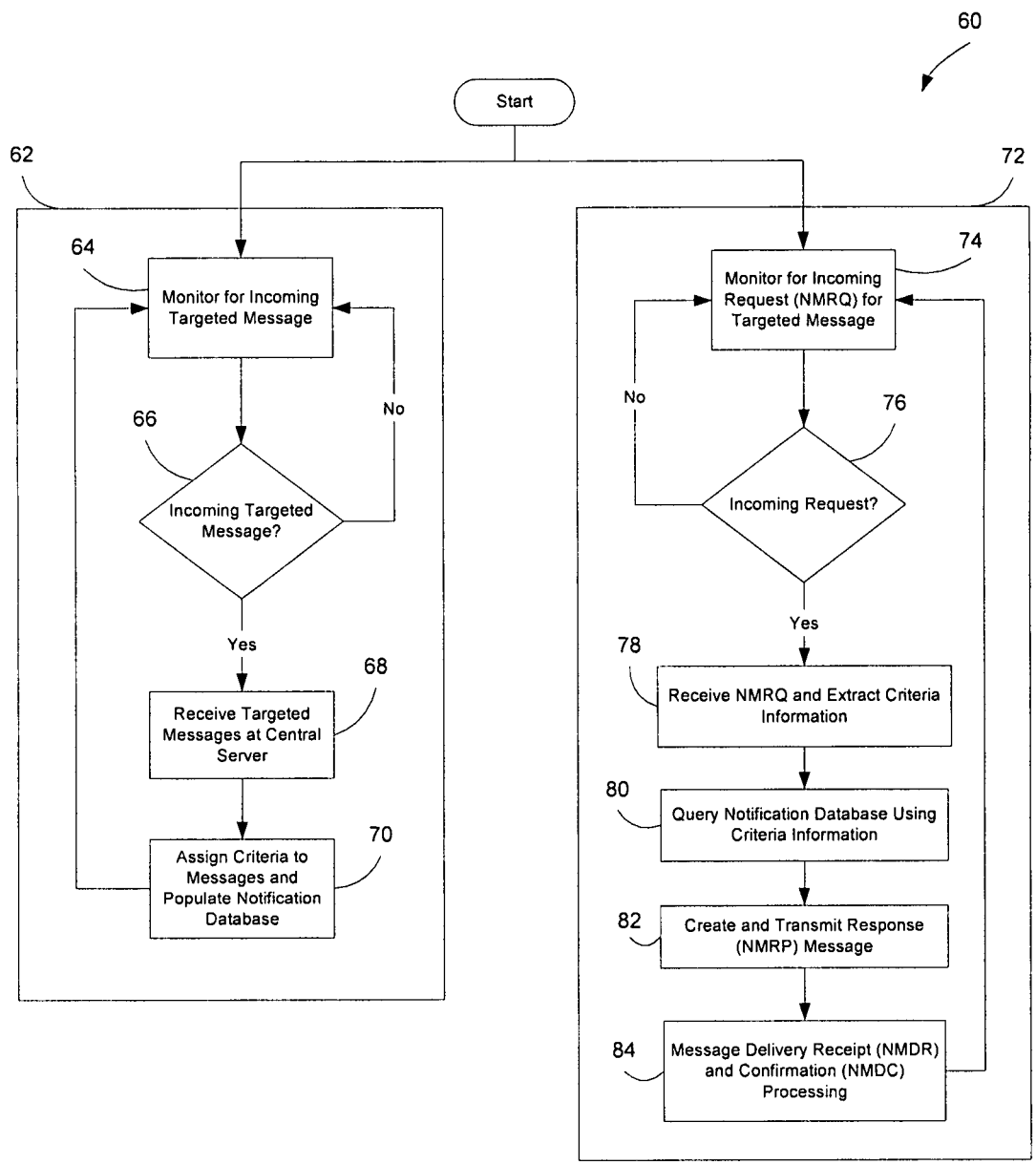
FIG. 3 is a flowchart showing processing logic of the targeted pharmaceutical messaging system of the present invention.

FIG. 3 is a flowchart, indicated generally at 60, showing processing logic of the TPMS 10 of the present invention. As mentioned above, the TPMS 10 stores targeted pharmaceutical messages from a plurality of data sources (e.g., pharmaceutical companies), processes requests for targeted pharmaceutical messages, and delivers targeted pharmaceutical messages to recipients in a plurality of formats and across a variety of hardware platforms. The TPMS 10 processes incoming targeted messages from one or more data sources in a message handling process 62, and incoming requests for targeted messages are processed in a request handling process 72.

The message handling process 62 begins with monitoring step 64, wherein the TPMS 10 monitors for incoming targeted messages that are provided to the TPMS 10 from a data source, such as the pharmaceutical companies 22a-22c of FIG. 1. In step 66, a determination is made as to whether an incoming targeted message has been received by the TPMS 10. If a negative determination is made, step 64 is repeated. If a positive determination is made, step 68 occurs, wherein one or more targeted messages are received at the TPMS 10. Then, in step 70, one or more of the aforementioned pre-defined criteria are assigned to each message. Then, the notification database 14 (see FIGS. 1-2) of the TPMS 10 is populated with the one or more targeted messages after the criteria have been assigned. Then, steps 64-70 are repeated so that additional incoming messages can be monitored for and processed.

The targeted message request handling process 72 begins with step 74, wherein the TPMS 10 monitors for an incoming request (i.e., an NMRQ request discussed above) for a targeted message. Such a request could be issued from one or more of the plurality of message requesters 30 of FIG. 1. In step 76, a determination is made as to whether an incoming request has been received by the TPMS 10. If a negative determination is made, step 76 is repeated so that incoming requests can be monitored for. If a positive determination is made, step 78 occurs, wherein the incoming request is received at the web server 16 (see FIG. 1) of the TPMS 10.

In step 80, the notification database 14 (see FIG. 1) of the TPMS 10 is queried using the pre-defined criteria information in the received NMRQ request to locate a record in the notification database 14 corresponding to a matching targeted message. The query could be based on a single pre-defined criteria, or multiple pre-defined criteria, and could be specified in a suitable query language, such as Structured Query Language (SQL). Any desired query conditions could be specified. For example, the query could require that the following conditions must be met:

1. Drug NDC in queried record must match NDC number specified in NMRQ;

2. Values for one of last fill date, first fill date, days of remaining supply, original number of refills authorized, number of refills remaining, patient age, or patient gender must be within minimum and maximum values specified in NMRQ; and 3. If conditions (1) and (2) above are not satisfied, find record having patient diagnosis and/or patient disease state matching diagnosis and/or disease state specified in NMRQ.

In step 82, after querying is complete and a matching record is retrieved from the notification database 14, a response (NMRP) is generated by the TPMS 10 and transmitted to the message requester (i.e., one or more of the message requesters 30 of FIGS. 1-2). As mentioned above, the NMRP could include fields of information which identify a matching targeted message text and/or voice file. When the NMPR is received by the message requester, the targeted message text and/or voice file identified in the NMPR is then accessed by the message requester, and the targeted message contained therein is conveyed to the requester. The message could be downloaded from a location (e.g., a URL) specified in the NMPR, using any suitable transfer protocol such as Secure File Transfer Protocol (SFTP). In step 84, the aforementioned message delivery receipt (NMRP) and confirmation (NMDC) processes are carried out, and the transaction is completed. Steps 74-84 are then repeated so that additional requests for targeted messages can be received and processed. It should be noted that the monitoring steps 64 and 74 described above could be performed using a single web server which automatically responds to incoming requests, in real time.

Figure 4:
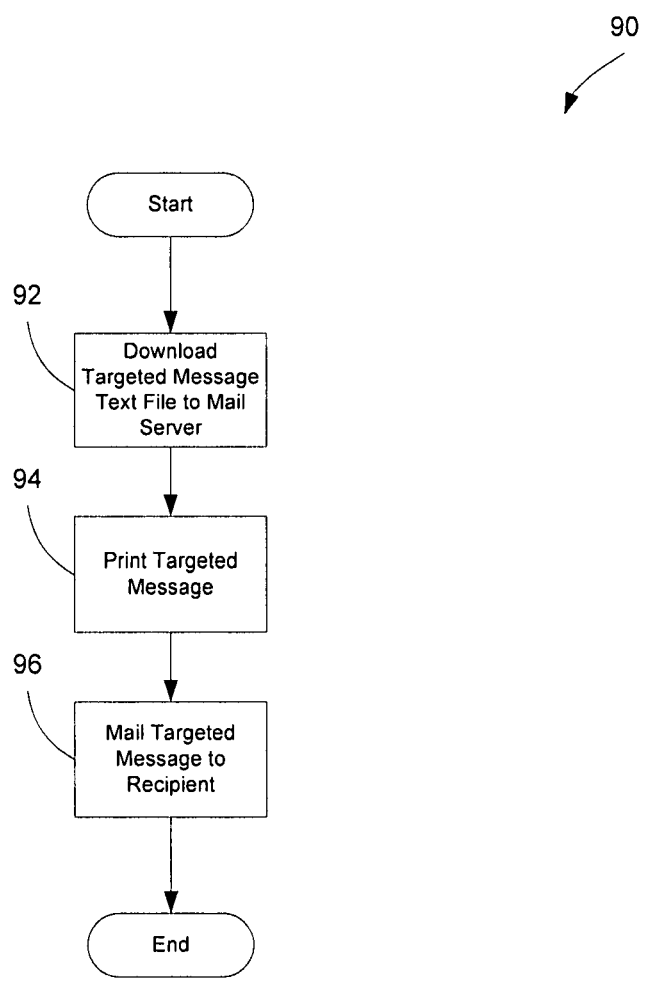
FIG. 4 is a flowchart showing steps for mailing a targeted pharmaceutical message generated by the present invention to a recipient.

FIG. 4 is a flowchart, indicated generally at 90, showing steps for mailing a targeted pharmaceutical message generated by the present invention to a recipient. In step 92, an HTTP (SOAP) request for a targeted message (containing one or more of the pre-defined criteria discussed above) is transmitted to the TPMS 10 from a mail server, such as the mail server 34 of FIG. 1, and the request is processed as discussed above with reference to FIG. 2. A text file containing a matching targeted message is then downloaded from the TPMS 10 to the mail server. In step 94, the text file is printed using a local or networked printer, such as the printer 36 of FIG. 1. It should be noted that the text file could be edited or formatted as desired prior to printing. In step 96, the printed targeted message is then mailed to a recipient, such as a pharmacy customer, doctor's office, etc. The recipient could be provided with the ability to "opt-in" to one or more selected targeted messaging campaigns, which could be encouraged through monetary incentives.

Figure 5:
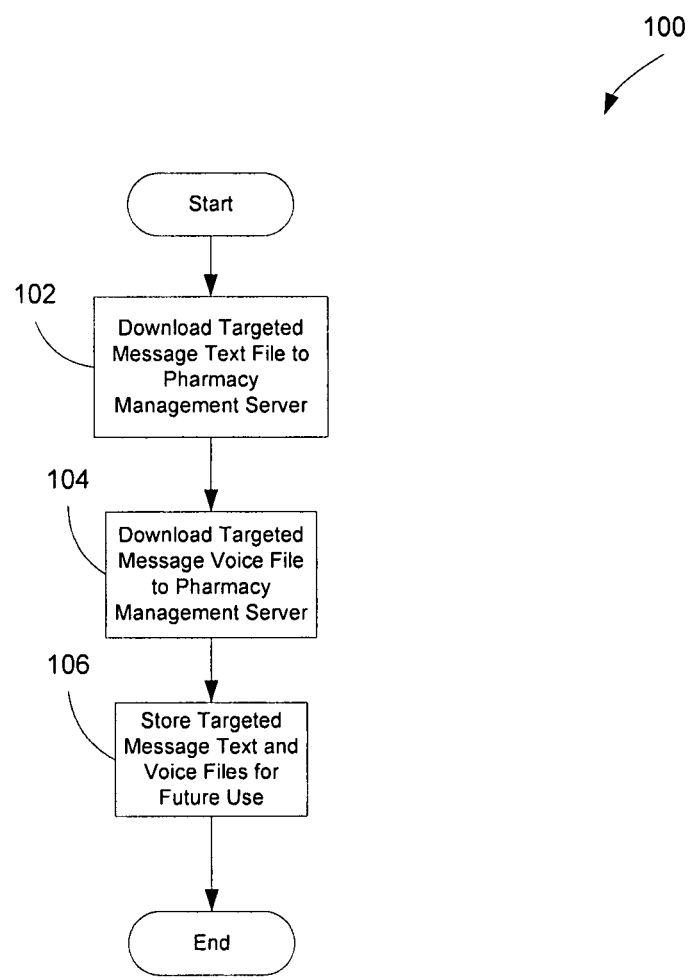
FIG. 5 is a flowchart showing steps for providing a targeted pharmaceutical message generated by the present invention to a pharmacy management computer system.

FIG. 5 is a flowchart, indicated generally at 100, showing steps for providing a targeted pharmaceutical message generated by the present invention to a pharmacy management computer system. Such a system could include, for example, any commercially-available computer software and associated hardware utilized to manage pharmacy records, transactions, supplies, business records, etc. In step 102, an HTTP request for a targeted message (containing one or more of the pre-defined criteria discussed above) is transmitted to the TPMS 10 from a pharmacy management computer system, such as the system 38 of FIG. 1, and the request is processed as discussed above with reference to FIG. 2. A text file containing a matching targeted message is downloaded from the TPMS 10 to the pharmacy management computer system. In step 104, a targeted message voice file is downloaded to the pharmacy management computer system. In step 106, the targeted message text and voice files are preferably transmitted whenever prescription-related activity occurs, i.e., in real time. For example, when a pharmacist retrieves a prescription refill request from the pharmacy management computer system, a targeted message could be conveyed to the pharmacist. Optionally, the targeted message text and voice files could be stored in the pharmacy management computer system for future use. The pharmacist could be provided with the ability to "opt-in" to one or more selected targeted messaging campaigns, which could be encouraged through monetary incentives. Such targeted message campaigns could occur in response to future refill activities initiated by the pharmacist, such that targeted messages are automatically conveyed to the pharmacist. If a pharmacist chooses not to participate, he or she can disable targeted messages so that they are not conveyed during refill activities.

Figure 6:
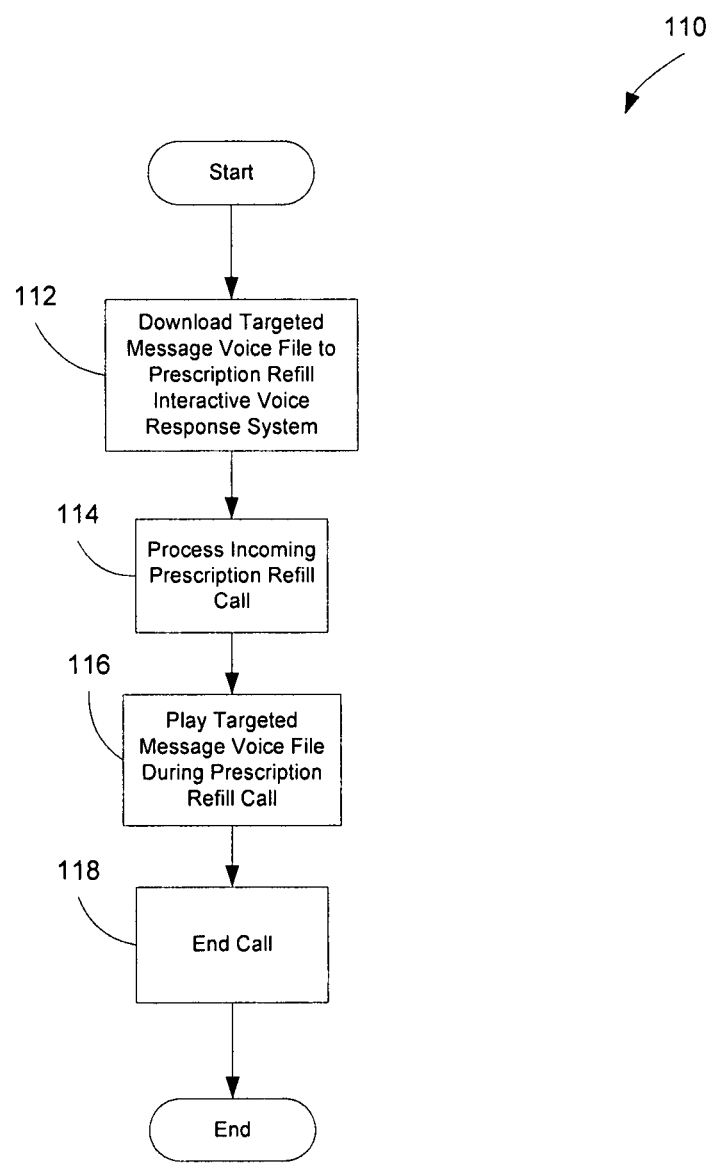
FIG. 6 is a flowchart showing steps for providing an audible targeted pharmaceutical message generated by the present invention during a telephonic prescription refill request.

FIG. 6 is a flowchart, indicated generally at 110, showing steps for providing an audible targeted pharmaceutical message generated by the present invention during a telephonic prescription refill request. In step 112, an HTTP request for a targeted message (containing one or more of the pre-defined criteria discussed above) is transmitted to the TPMS 10 from an interactive voice response (IVR) prescription refill system, such as the system 40 of FIG. 1, and the request is processed as discussed above with reference to FIG. 2. A matching targeted voice message file is then downloaded to the IVR prescription refill system. In step 114, an incoming prescription refill telephone call is processed by the IVR prescription refill system. Then, in step 116, during processing of the prescription refill, or shortly thereafter, the downloaded targeted message voice file is played to the caller. In step 118, the call is ended. The caller could be provided with the ability to "opt-in" to one or more selected targeted messaging campaigns, which could be encouraged through monetary incentives. Such targeted message campaigns could occur in response to future calls, such that targeted messages are automatically conveyed to the caller. If a caller chooses not to participate, he or she can disable targeted messages so that they are not conveyed during calls.

Figure 7:
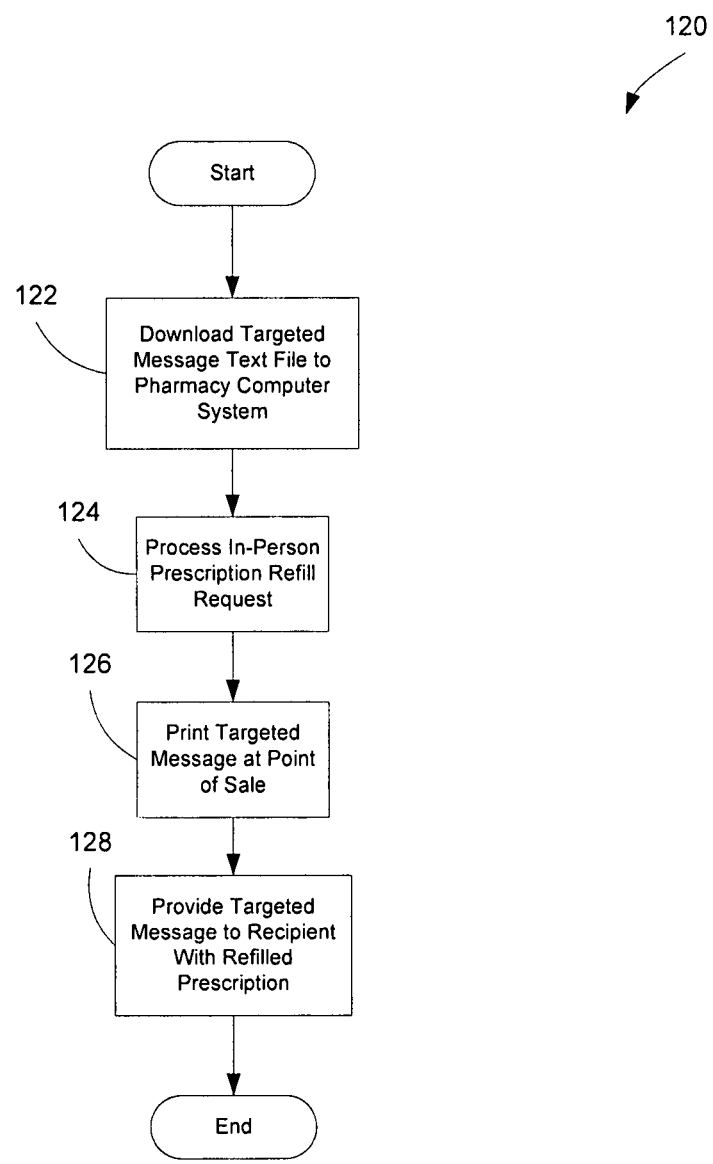
FIG. 7 is a flowchart showing steps for providing a targeted pharmaceutical message generated by the present invention to a recipient at a pharmacy point of sale.

FIG. 7 is a flowchart, indicated generally at 120, showing steps for providing a targeted pharmaceutical message generated by the present invention to a recipient at a pharmacy point of sale. In step 122, an HTTP request for a targeted message (containing one or more of the pre-defined criteria discussed above) is transmitted to the TPMS 10 from a point-of-sale pharmacy computer system, such as the system 44 of FIG. 1, and the request is processed as discussed above with reference to FIG. 2. A matching targeted message text file is then downloaded to a pharmacy computer system. Targeted messages could be provided in real time, i.e., whenever a prescription-related activity occurs, or they could be downloaded to the pharmacy computer system for future use. In step 124, an in-person (i.e., a customer at a pharmacy) prescription refill request is processed using the pharmacy computer system. In step 126, while the prescription refill request is processed, the targeted message text file is printed (e.g., at the point of sale). Then, in step 128, the printed targeted message is provided to the customer with the refilled prescription. The targeted message could be provided to the customer when the filled prescription is picked up, or when it is delivered to the recipient's home. Pharmacy personnel could be provided with the ability to "opt-in" to one or more selected targeted messaging campaigns, which could be encouraged through monetary incentives. Such targeted message campaigns could occur in response to future refill activities, such that targeted messages are automatically conveyed to the pharmacy personnel. If pharmacy personnel choose not to participate, targeted messages can be disabled so that they are not conveyed in the future.

Figure 8:
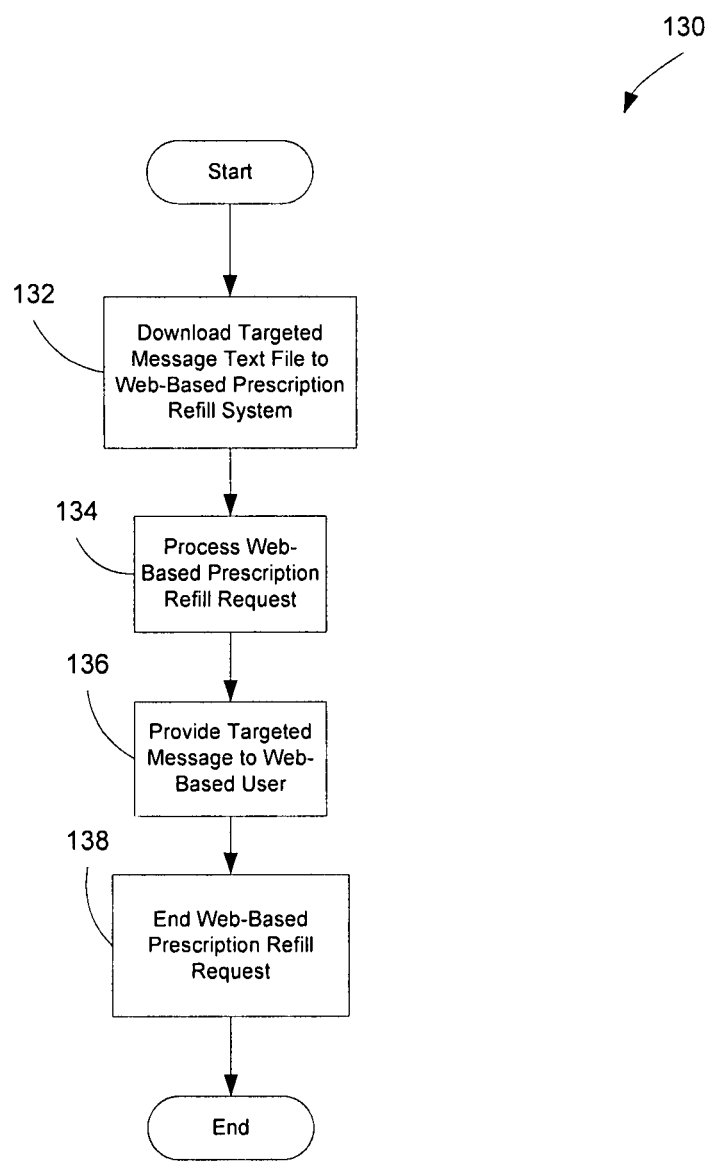
FIG. 8 is a flowchart showing steps for providing a targeted pharmaceutical message generated by the present invention in a web-based prescription refill request.

FIG. 8 is a flowchart, indicated generally at 130, showing steps for providing a targeted pharmaceutical message generated by the present invention in a web-based prescription refill request. The web-based prescription refill system allows a user to refill a prescription over the Internet. In step 132, an HTTP request for a targeted message (containing one or more of the pre-defined criteria discussed above) is transmitted to the TPMS 10 from a web-based prescription refill system, such as the system 48 of FIG. 1, and the request is processed as discussed above with reference to FIG. 2. A matching targeted message text file is downloaded to a web-based prescription refill system, such as the system 48 of FIG. 1. In step 134, a prescription refill request is processed by the web-based prescription refill system, and the prescription is refilled. In step 136, the targeted message is provided to the web-based user. The targeted message could be displayed using a conventional web browser. Optionally, a targeted voice or multimedia message could be played to the user. In step 138, the web-based prescription refill request is completed. The web-based user could be provided with the ability to "opt-in" to one or more selected targeted messaging campaigns, which could be encouraged through monetary incentives. Such targeted message campaigns could occur in response to future refill activities initiated by the user, such that targeted messages are automatically conveyed to the user. If a user chooses not to participate, he or she can disable targeted messages so that they are not conveyed in the future.

Figure 9:
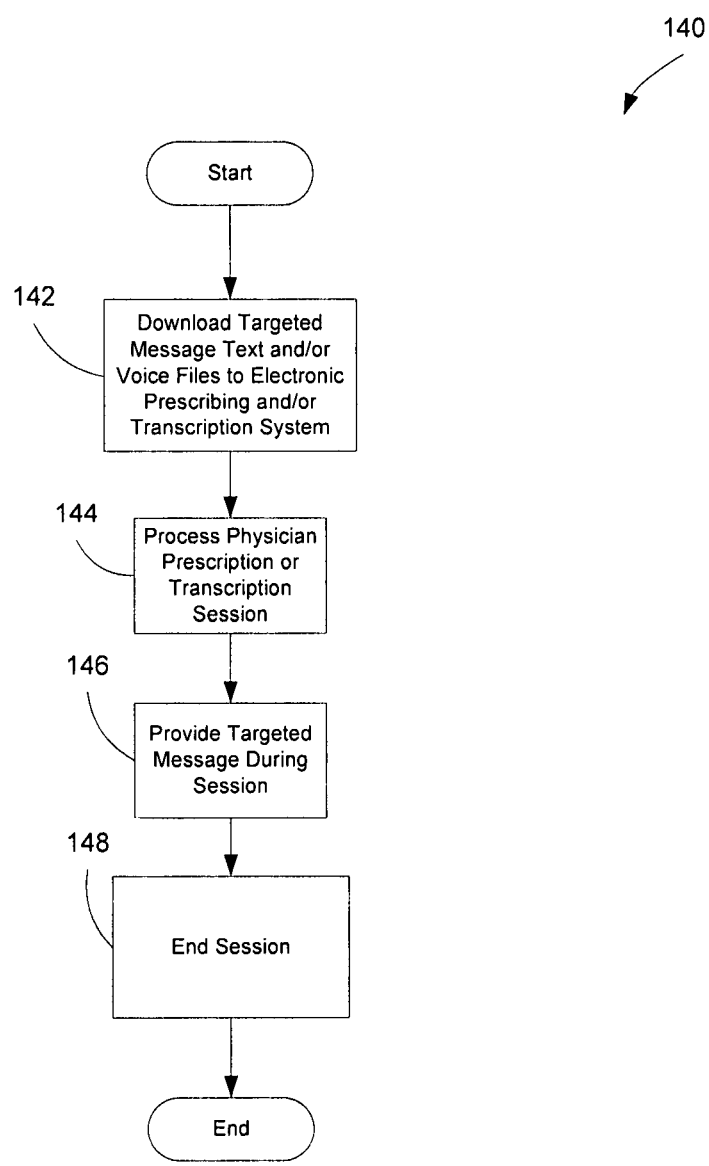
FIG. 9 is a flowchart showing steps for providing a targeted pharmaceutical message generated by the present invention in an electronic prescription and/or transcription session.

FIG. 9 is a flowchart, indicated generally at 140, showing steps for providing a targeted pharmaceutical message generated by the present invention in an electronic prescription and/or transcription session. Electronic prescription ("e-prescribe") systems allow physicians to electronically generate prescriptions for patients and to transmit same to a pharmacy. An electronic transcription system provides a central server that receives telephone calls from doctors, allows the doctors to speak a prescription, and automatically transcribes the spoken prescription into text using voice recognition technology. An example of such a system is disclosed in U.S. Pat. No. 6,804,654 to Kobylevsky, et al., the entire disclosure of which is expressly incorporated herein by reference in its entirety.

In step 142, an HTTP request for a targeted message (containing one or more of the pre-defined criteria discussed above) is transmitted to the TPMS 10 from an electronic prescription and/or transcription system, such as the system 50 of FIG. 1, and the request is processed as discussed above with reference to FIG. 2. A matching targeted message text file, and/or a matching targeted message voice file is provided to the physician during the prescription and/or transaction session, i.e., in real time. Optionally, messages could be downloaded to electronic prescription and/or transcription system and stored for future use. In step 144, a prescription and/or transcription session is processed. In step 146, the targeted message is provided to the physician. During an e-prescription session, a targeted message text file could be displayed to the physician on a computer system utilized by the physician during the e-prescription session. Optionally, a voice or multimedia targeted message could be played to the physician. During an electronic transcription session, a targeted message voice file could be played to the physician. Importantly, physicians could be provided with the ability to "opt-in" to one or more selected targeted messaging campaigns issued by a pharmaceutical company. The decision to opt-in could be encouraged through monetary incentives. Such targeted message campaigns could occur in future prescription or transcription sessions initiated by the physician, such that targeted messages are automatically conveyed to the physician in future sessions. If a physician chooses not to participate, he or she can disable targeted messages so that they are not conveyed during prescription or transcription sessions. In step 148, the prescription and/or transcription session is ended.

Figure 10:
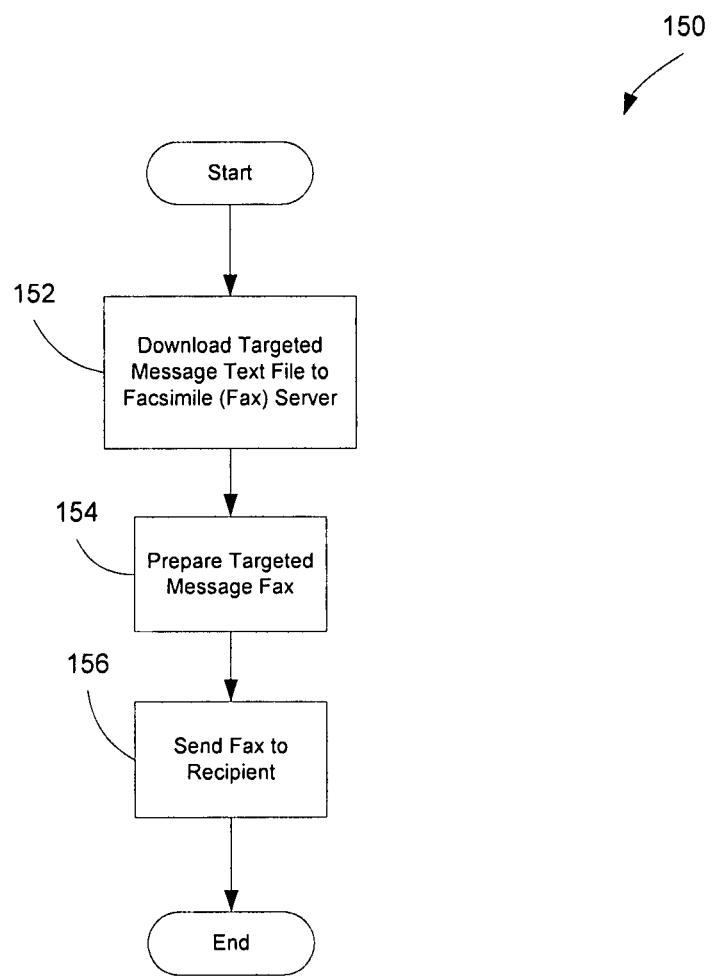
FIG. 10 is a flowchart showing processing steps for faxing a targeted pharmaceutical message generated by the present invention to a recipient.

FIG. 10 is a flowchart, indicated generally at 150, showing processing steps for faxing a targeted pharmaceutical message generated by the present invention to a recipient. In step 152, an HTTP request for a targeted message (containing one or more of the pre-defined criteria discussed above) is transmitted to the TPMS 10 from a fax server, such as the fax server 54 of FIG. 1, and the request is processed as discussed above with reference to FIG. 2. A text file containing a matching targeted message is then downloaded from the TPMS 10 to the fax server. In step 154, a fax containing the targeted message is prepared. In step 156, the fax is then transmitted to a recipient, such as a pharmacy customer, doctor's office, etc. The recipient could be provided with the ability to "opt-in" to one or more selected targeted messaging campaigns, which could be encouraged through monetary incentives.

Having thus described the invention in detail, it is to be understood that the foregoing description is not intended to limit the spirit or scope thereof. What is desired to be protected is set forth in the following claims.

What is claimed is:

1. A system for targeted healthcare messaging, comprising:
a first computer system for receiving a targeted healthcare message uploaded to the first computer system from a data source remote from the first computer system, the first computer system allowing the data source to create at least one pre-defined criteria to and to associate the at least one pre-defined criteria with the targeted healthcare message, the first computer system in communication with the data source;
a database in communication with the first computer system for storing the targeted healthcare message and the at least one pre-defined criteria;
a second computer system remote from the first computer system for automatically generating a request for a targeted healthcare message whenever a prescription-related activity occurs at the second computer system, the request including a field of information relating to the prescription-related activity; and
a third computer system remote from the second computer system and in communication with the first computer system, the third computer system receiving the request for the targeted healthcare message,
wherein the request is processed to extract the field of information relating to the prescription-related activity and a matching targeted healthcare message is identified by comparing the field of information to the pre-defined criteria, the matching targeted healthcare message is transmitted to the second computer system, and the second computer system conveys the matching targeted healthcare message to a recipient.

2. The system of claim 1, wherein the data source comprises a pharmaceutical company.

3. The system of claim 1, wherein the data source comprises an entity interested in providing targeted healthcare messages to consumers.

4. The system of claim 1, wherein the targeted healthcare message comprises an advertisement relating to a pharmaceutical product.

5. The system of claim 1, wherein the targeted healthcare message comprises a text file containing information about a pharmaceutical product.

6. The system of claim 1, wherein the targeted healthcare message comprises a voice file containing information about a pharmaceutical product.

7. The system of claim 1, wherein the request for a targeted healthcare message and the matching targeted healthcare message are transmitted using Simple Object Access Protocol (SOAP).

8. The system of claim 1, wherein the second computer system comprises a mail server and the matching targeted healthcare message is transmitted to the mail server for mailing the matching targeted healthcare message to a recipient.

9. The system of claim 1, wherein the second computer system comprises a pharmacy management system and the matching targeted healthcare message is transmitted to the pharmacy management system for storage therein.

10. The system of claim 1, wherein the second computer system comprises a prescription refill interactive voice response system and the matching targeted healthcare message is transmitted to the prescription refill interactive voice response system for conveying the message to a caller during a prescription refill call.

11. The system of claim 1, wherein the second computer system comprises a point-of-sale computer system at a pharmacy and the matching targeted healthcare message is transmitted to the point-of-sale computer system at the pharmacy for printing the message and conveying a printed targeted healthcare message to a pharmacy customer.

12. The system of claim 1, wherein the second computer system comprises a web-based prescription refill system and the matching targeted healthcare message is transmitted to the web-based prescription refill system for conveying the message to a user during a prescription refill session.

13. The system of claim 1, wherein the second computer system comprises an electronic prescription system and the matching targeted healthcare message is transmitted to the electronic prescription system for conveying the message to a user during a prescription generation session.

14. The system of claim 1, wherein the second computer system comprises an electronic transcription system and the matching targeted healthcare message is transmitted to the electronic transcription system for conveying the message to a caller during a prescription transcription session.

15. The system of claim 1, wherein the second computer system comprises a facsimile server and the matching targeted healthcare message is transmitted to the facsimile server for faxing the message to a recipient.

16. The system of claim 1, further comprising a web page for allowing the data source to upload the targeted healthcare message to the first computer system.

\* \* \* \* \*

UNITED STATES PATENT AND TRADEMARK OFFICE
CERTIFICATE OF CORRECTION

| | | |
|---|---|---|
| PATENT NO. | : 8,738,393 B2 | |
| APPLICATION NO. | : 11/711496 | |
| DATED | : May 27, 2014 | |
| INVENTOR(S) | : Paul Kobylevsky et al. | |

It is certified that error appears in the above-identified patent and that said Letters Patent is hereby corrected as shown below:

In the Claims

In Column 10, line 19, the first instance of the word "to" should be deleted.

Signed and Sealed this
Twenty-fourth Day of March, 2015

Michelle K. Lee
*Director of the United States Patent and Trademark Office*